(12) United States Patent
Folkestad

(10) Patent No.: US 12,399,675 B2
(45) Date of Patent: Aug. 26, 2025

(54) SOUND GENERATING ARRANGEMENT

(71) Applicant: Folkestad Sino-Skandinavien AB, Mölnlycke (SE)

(72) Inventor: Fredrik Folkestad, Mölnlycke (SE)

(73) Assignee: Folkestad Sino-Skandinavien AB, Mölnlycke (SE)

( * ) Notice: Subject to any disclaimer, the term of this patent is extended or adjusted under 35 U.S.C. 154(b) by 230 days.

(21) Appl. No.: 18/268,706

(22) PCT Filed: Dec. 21, 2021

(86) PCT No.: PCT/SE2021/051301
§ 371 (c)(1),
(2) Date: Jun. 21, 2023

(87) PCT Pub. No.: WO2022/139671
PCT Pub. Date: Jun. 30, 2022

(65) Prior Publication Data
US 2024/0036809 A1 Feb. 1, 2024

(30) Foreign Application Priority Data

Dec. 22, 2020 (SE) ..................... 2051544-1

(51) Int. Cl.
*G06F 3/16* (2006.01)
*G10K 15/02* (2006.01)
*H04R 1/02* (2006.01)

(52) U.S. Cl.
CPC .............. *G06F 3/165* (2013.01); *G10K 15/02* (2013.01); *H04R 1/025* (2013.01); *H04R 1/028* (2013.01); *H04R 2499/13* (2013.01)

(58) Field of Classification Search
CPC ........ G06F 3/165; G10K 15/02; H04R 1/025; H04R 1/028; H04R 2499/13
See application file for complete search history.

(56) References Cited

U.S. PATENT DOCUMENTS 6,748,355 B1 * 6/2004 Miner ................ G10L 13/00
704/E19.01
9,616,813 B2 4/2017 Kang
9,723,409 B2 8/2017 Smearcheck et al.
(Continued)

FOREIGN PATENT DOCUMENTS

DE 102015223517 A1 6/2017
DE 102015223523 A1 6/2017
(Continued)

OTHER PUBLICATIONS

International Search Report and Written Opinion for International Application No. PCT/SE2021/051301 mailed Jan. 17, 2022 (11 pages).

(Continued)

*Primary Examiner* — Andrew Sniezek
(74) *Attorney, Agent, or Firm* — RMCK Law Group, PLC

(57) ABSTRACT

The present disclosure generally relates to an arrangement for use in emitting a sound externally of a moving vehicle, specifically taking into account at least one operational parameter relating to the moving vehicle when forming the sound to be emitted. The present disclosure also relates to a corresponding computer implemented method and a computer program product.

16 Claims, 3 Drawing Sheets

(56) References Cited

U.S. PATENT DOCUMENTS

| | | | |
|---|---|---|---|
| 2009/0092276 A1* | 4/2009 | McSweyn | H04R 1/025 |
| | | | 381/395 |
| 2014/0056438 A1 | 2/2014 | Baalu et al. | |
| 2014/0085071 A1 | 3/2014 | Tsuzuki et al. | |
| 2020/0189458 A1 | 6/2020 | Akahori | |

FOREIGN PATENT DOCUMENTS

| | | |
|---|---|---|
| DE | 202020104121 U1 | 8/2020 |
| EP | 1562177 A2 | 8/2005 |

OTHER PUBLICATIONS

Swedish Search Report for SE Application No. 2051544-1 mailed Aug. 20, 2021 (3 pages).
Extended European Search Report dated Sep. 18, 2024 for EP Application No. 21911677.9, 9 pages.

* cited by examiner

SOUND GENERATING ARRANGEMENT

CROSS-REFERENCE TO RELATED APPLICATIONS

This application is a 371 U.S. National Stage of International Application No. PCT/SE2021/051301, filed Dec. 21, 2021, which claims priority to Swedish Patent Application No. 2051544-1, filed Dec. 22, 2020. The disclosures of each of the above applications are incorporated herein by reference in their entirety.

TECHNICAL FIELD

The present disclosure generally relates to an arrangement for use in emitting a sound externally of a moving vehicle, specifically taking into account at least one operational parameter relating to the moving vehicle when forming the sound to be emitted. The present disclosure also relates to a corresponding computer implemented method and a computer program product.

BACKGROUND

Traditional vehicles provided with a combustion engine generates inherently a sound from the combustion engine that is easily detected by e.g. a pedestrian or cyclist located within a vicinity of the vehicle, ensuring that the pedestrian is readily aware of the vehicle.

Modern vehicles, possibly fully electrical or being so called hybrid vehicles, are in comparison to the mentioned traditional vehicles quiet or at least quieter, thus generally decreasing an awareness level, even for a pedestrian/cyclist being close to the vehicle. Although this is beneficial to the environment, it can also result dangerous for the pedestrian/cyclists, since they may not hear the approaching vehicle.

The European Union as well as the National Highway Traffic Safety Administration (NHTSA) under DOT (Department of Transportation) in U.S.A has recently introduced new rules on noise emitting to protect vulnerable road users, such as for example and including the mentioned pedestrian or cyclist. According to the rulings, it is mandated that all new types of electric and hybrid vehicles to be fitted with an acoustic vehicle alerting system (AVAS). The AVAS should be configured to automatically generate a sound from the start of the vehicle up to the speed of approximately 20 km/h, and during reversing.

The underlying problem has however been known for many years and a possibly solution to this problem is for example disclosed in U.S. Pat. No. 9,616,813. U.S. Pat. No. 9,616,813 discloses a sound generating device for a vehicle, specifically suggesting to fastening the sound generating device onto a bonnet of the vehicle, for outputting an artificial engine sound (for example, start-up, or accelerating etc.). The sound generating device's sound transfer face is pressed to the bonnet, and the sound or vibration of the sound generator is dispersed and output outwardly through the bonnet.

Even though the solution as suggested in U.S. Pat. No. 9,616,813 improve awareness for pedestrians or cyclists located within a vicinity of the vehicle, the suggested approach of press-fitting the sound generating device to the onto a bonnet of the vehicle has shown to be affected by vibrations generated during operation of the vehicle. This will over time reduce the efficiency of the implementation, resulting in a safety concern.

A further example of a sound generating device is presented in US2020189458, where the sound generating device is arranged to produce a sound that is emitted by a speaker toward a vehicle exterior when the vehicle is moving. However, also the solution according to US2020189458 has shown to be problematic in regards to ensuring that the emitted sound in fact is received by e.g. vulnerable road users in the surrounding of the moving vehicle. Taking the above into account, it would accordingly be desirable to introduce a novel approach for distributing awareness related sounds in relation to a vehicle, having an improved lifetime and thus ensuring a longevity of the awareness provided to the vulnerable road users.

SUMMARY

According to an aspect of the present disclosure, the above is at least partly met by a sound generating arrangement adapted to emit a sound externally of a moving vehicle, the arrangement comprising a control unit, a driving unit and an electroacoustic transducer, the driving unit connected to the electroacoustic transducer, wherein the electroacoustic transducer comprises a fastener to connect the electroacoustic transducer to a part of the vehicle, wherein the arrangement is adapted to receive, at the control unit, a first indication that the sound is to be emitted, receive, at the control unit, a first operational parameter relating to the moving vehicle, form, using the control unit and only if the first indication is received, a sound control signal using a synthesizing module comprised within the control unit, wherein the sound control signal is formed based on the first operational parameter and is selected to depend on which part of the vehicle the electroacoustic transducer is connected to, and control, using the control unit and the driver, the electroacoustic transducer to emit the sound based on the sound control signal.

By means of the present disclosure, the sound to be transmitted if formed "on the fly" using a synthesizing module that is comprised within the control unit, as compared to general prior art approaches typically implementing different forms of playback functionalities. Advantages following the implementation scheme according to the present disclosure includes the possibility of emitting purposely crafted sounds, based at least on the first operational parameter relating to the moving vehicle, even in case the memory element is made in comparison large.

Focusing on emitting purposely crafted sounds can ensure that the awareness of the vulnerable road users can be increased as compared to general prior art implementations where the sound emission is based on prerecorded sounds. In fact, the inventor has identified that a correctly formed and then emitted sound may assist e.g. persons in the vicinity of the vehicle to make the "right" decision when hearing the e.g. approaching vehicle. This is as wound be apparent specifically of interest when the vehicle is operated within an area where no traffic signals are present, and the decisions taken by the persons have great impact on the overall safety in operating the vehicle.

Furthermore, prior art implementations relying on prerecorded sounds only have limited means for making the prerecorded sounds truly purposeful, generally only allowing for an adjustment of the sound level (volume) of the emitted sound. Still further, since the implementation scheme according to the present disclosure may be provided without any or a very limited memory element, it is possible to reduce the production cost of the sound generating arrangement, making the solution attractive to the automotive industry generally being under a constant price pressure.

Another advantage resulting from real-time generated sounds using the synthesizing module is a reduced latency relating to how fast the purposely crafted sounds may be emitted, as compared to prior art implementations relying on prerecorded sounds. That is, by means of the implementation according to the present disclosure it is not necessary to spend time on "searching" for a suitable prerecorded sound, where the prerecorded sounds for example are stored in a database. A reduced latency in turn provides for a safer and more reliable implementation, since the "right" sound may be delivered to the environment of the vehicle in a quicker manner as compared to prior-art.

The synthesizing module may generally be implemented as a module of the control unit. However, the expression "synthesizing module comprised within the control unit" should within the context of the present disclosure be interpreted in a broad manner, including any form of hardware, software or combination thereof that is operated in conjunction with the control unit for generating a sound control (audio) signal. The synthesizing module may furthermore implement different audio-based methods including subtractive synthesis, additive synthesis, and frequency modulation synthesis for forming the sound control signal as used in relation to the present disclosure. Additionally, the sounds generated at the synthesizing module may be shaped and modulated by further components, such as filters, envelopes, and low-frequency oscillators. The mentioned and other related components also be comprised with/operated in conjunction with the control unit.

Additionally, by allowing the sound control signal to be at least partly dependent on which part of the vehicle the electroacoustic transducer is connected to (possibly in combination with how the electroacoustic transducer is connected to the body part, as will be elaborated below) may provide further advantages when emitting the sound to the surrounding of the vehicle. For example, some preferably used vehicle parts for connecting the electroacoustic transducer can in some embodiments be nonlinear in their behavior, such as dependent on a surrounding temperature, speed of the vehicle, etc. As such, by for example selecting to adapt the control signal in such a manner it may be possible to provide additional enhancements to the emitted sound, thereby again ensuring that the persons in the vicinity of the vehicle to make the right decision when hearing the approaching vehicle. Taking this information into account may as such improve safety when operating a vehicle comprising the present sound generating arrangement.

In a preferred embodiment of the present disclosure the synthesizing module is adapted to apply a wavelet transform for forming the sound control signal. Arranging the synthesizing module to implement wavelet transformation-based sound formation has shown promising since such a solution allows for an efficient formation of many complex sounds at an in comparison high quality. Thus, the possibility of allowing the synthesizing module to form complex sounds aligns wells with the focus, according to the present disclosure, towards emitting purposeful sounds within the surrounding of the vehicle to increase a general awareness level.

In line with the present disclosure, the control unit may in one embodiment be an electronic control unit (ECU), also used at least in part for controlling functions in relation to the vehicle. However, at least one portion of the functionality of the control unit may in some alternative embodiments be performed using a remote server such as a cloud server, where the cloud server being network connected to an/the electronic control unit (ECU) provided in conjunction with the vehicle.

Preferably, the sound generating arrangement is further adapted to receive, at the control signal, a second operational parameter relating to a surrounding of the moving vehicle, wherein forming the sound control signal is further based on the second operational parameter. Allowing the synthesizing module to operate not only based on a (first) parameter relating to the moving vehicle, but also making the sound formed by the synthesizing module to take into account the surrounding of the vehicle may allow the sound emitted to the surrounding of the vehicle to even further heighten the awareness of any living objects, such as the mentioned pedestrian/cyclist and/or an animal, that is arranged in a vicinity of the vehicle.

Possibly, the first operational parameter is dependent on a current speed of the moving vehicle or a temperature measured in relation to the moving vehicle. In line with the discussion as presented above, the speed of the moving vehicle could influence e.g. a sound level of the emitted sound, thereby ensuring that the sound is heard from a further distance (as compared to if a lower sound level was selected). However, it may also and in line with the present disclosure be possible to for example change a frequency response or a pitch of the generated sound, for ensure that the living object in the vicinity of the vehicle becomes aware of the vehicle. In accordance to the present disclosure it is also possible to make changes in wavetable position and to perform e.g. equalizer (EQ) and or filter operations to the sound control signal.

In some embodiments it may be desirable to select an in comparison lower frequency within the frequency range where the human ear is mostly sensitive (3000 Hz-4000 Hz), since low frequency waves travel further than high frequency waves, because there is less energy transferred to the medium (i.e. the surrounding "air"). The in comparison lower frequency may thus be transmitted with a lower sound level as compared to the opposite, possibly making the sound emitted from the vehicle less disturbing in a close vicinity of the vehicle.

As mentioned above also the temperature measured in relation to the moving vehicle may be allowed to influence how the synthesizing module forms the sound to be emitted. As such, in case the temperature measured in relation to the moving vehicle is determined to be in comparison high, then the sound level could be kept in comparison lower, since sound travels further in (in comparison) higher temperature. With the above in mind, it may again be possible to ensure that persons within close vicinity of the vehicle is less disturbed, while persons further away from the vehicle is made aware of the vehicle in good time.

Similarly, the distribution of the emitted sound may be affected by other factors such as humidity and air pressure. Accordingly, also measurement relating to e.g. humidity and air pressure may be allowed to have impact on the formation of the sound signal by the synthesizing module.

Following the discussion above in relation to the synthesizing module also taking into account the second operational parameter, it may be possible and within the scope of the present disclosure to allow the second operational parameter to comprises information relating to a type of object located in a predefined surrounding of the moving vehicle. Accordingly, in one possible embodiment the control unit of the sound generating arrangement is arranged in communication with a Controller Area Network (CAN) bus of the vehicle. The CAN bus may in some embodiments hold information from e.g. an object detection system comprised with the vehicle, where the object detection system may make available information as to surrounding objects.

Different types of object to affect the sound control signal may for example include the above-mentioned pedestrian, cyclist or animal. An estimated age of the pedestrians/cyclists may also be taken into account when forming the sound control signal. That said, further object types are also possible, for example including another vehicle. It may also be possible to allow more than a single object to affect the formation of the sound control signal. As an example, in one embodiment a pedestrian and a truck are identified in the surrounding of the (own) vehicle provided with the sound generating arrangement. Since a truck is present is may be desirable to arrange the synthesizing module to form a sound control signal that for example has a frequency response and/or pitch that ensures that the pedestrian is made aware of the (own) vehicle, even due the truck potentially could make it difficult for the (own) vehicle to be heard.

In a further possible embodiment, it may also, or instead, be possible to allow the second operational parameter to comprises information relating to e.g. a present geographical location of the vehicle (for example received from the CAN bus, where the vehicle may be equipped with a GPS/GLONASS receiver, etc.). The present geographical location may accordingly, in one embodiment, be taken into account when forming the sound control signal. It may for example be possible to implement a so-called geofencing scheme, where different types of sounds are formed in case the vehicle is within a specific geofence. For example, it may be desirable to ensure that the formed sound has a specific volume and/or frequency when in a vicinity of a hospital or a school. When in a vicinity of a hospital it may for example be desirable to ensure that e.g. patients are disturbed as little as possible.

In line with the discussion above, it may also or alternatively be possible to take into account a time of the day or a day of the week when forming the sound control signal. For example, during the nighttime (e.g. between 8 pm to 8 am) be desirable to keep the volume of the emitted sound at or below a predetermined threshold. Also this embodiment allows for a possibility of reducing a general environmental disturbance in a vicinity of the vehicle.

Furthermore, the vehicle (or the sound generating arrangement) may in some embodiments be equipped with a sound recording device, such as including a microphone. An audio sequence (e.g. 10-200 seconds, or less or more) acquired using the microphone may for example be analyzed to determine an average ambient sound level (dB) in relation to the vehicle. The audio sequence may also, or instead, be analyzed for determining an ambient frequency spectrum in relation to the vehicle. Either of the volume or the frequency spectrum may be taken into account when forming the sound control signal, for example with the purpose of ensuring that the vehicle is identified by e.g. a pedestrian or cyclist, while at the same time ensuring that a possible disturbance is reduced. It should be understood that each as well as both of the volume and a frequency content of the emitted sound may be controlled.

As mentioned above the electroacoustic transducer comprised with the sound generating arrangement in turn comprises a fastener to connect the electroacoustic transducer to a part of the vehicle. A knowledge of which fastener is selected may be included when the synthesizing module forms the sound control signal. It may specifically, and in accordance to the present disclosure be possible to ensure that the sound control signal is formed to compensate for a type of fastener used for connecting the electroacoustic transducer to a part of the vehicle, since different fasteners as well as different parts of the vehicle may have different effects on sound emission.

Preferably the fastener generally comprises an adhesive or a silicon material. Using an adhesive of a silicon material has been identified by the present inventor as promising fastening materials, since it has shown to be possible to make use of an adhesive or silicon material that has a minimal attenuation effect on the sound emitted by the electroacoustic transducer, as compared to a "classic" bolt and nut connection. Furthermore, also the specific type of silicon material may be targeted towards maximizing how the sound from the electroacoustic transducer is transmitted to the part of the vehicle where the electroacoustic transducer is connected.

In some embodiments the electroacoustic transducer comprises a sound exciter. Such a sound exciter is used to vibrate the part of the vehicle where the electroacoustic transducer is connected, to make the part of the vehicle where the electroacoustic transducer is connected start to vibrate in accordance to the sound control signal. The vibrations in turn translate into auditory information with a result that is surprisingly accurate. Other types of electroacoustic transducers are however possible and within the scope of the present disclosure.

It should further be understood that it may be possible, and within the scope of the present disclosure to make use of more than a single electroacoustic transducer, such as two or more. The plurality of electroacoustic transducers may each be provided with a separate driving unit or use on and the same driving unit. When the sound generating arrangement comprises a plurality of electroacoustic transducers it could in some embodiments be possible to emit a "three-dimensional" (3D) sound. By arranging the sound generating arrangement according to the present disclosure to emit such a 3D sound it may be possible to (better) control a positioning of the vehicle in comparison to e.g. the pedestrian and/or cyclist.

The sound generating arrangement is preferably provided as a component of a vehicle. The vehicle may be a hybrid vehicle (comprising e.g. an internal combustion engine, ICE, and an electric machine) or a fully electrical vehicle (not comprising an ICE). The vehicle may in turn likewise be a manually, semi-autonomous or fully autonomous vehicle.

The process of emitting a purposely crafted sound is of course desirable when the vehicle is a manually operated vehicle. That said, the vehicle could also be a semi-autonomous or fully autonomous vehicle. In relation to the semi-autonomous or fully autonomous vehicle the impact of the present disclosure may be even more apparent, since the machine operating the semi-automated or fully automated vehicle may make assumptions of how the person or animal are to interact with e.g. an approaching vehicle. Ensuring that the person or animal is well informed of the vehicle, using the sound generating arrangement according to the present disclosure may make such "machine-based" decision making more reliable and thus less risky for the person or animal, as well as for occupants within the vehicle.

According to another aspect of the present disclosure there is provided a computer implemented method for operating a sound generating arrangement adapted to emit a sound externally of a moving vehicle, the arrangement comprising a control unit, a driving unit and an electroacoustic transducer, the driving unit connected to the electroacoustic transducer, wherein the electroacoustic transducer comprises a fastener to connect the electroacoustic transducer to a part of the vehicle and the method comprises the steps of receiving, at the control unit, a first indication that the sound is to be emitted, receiving, at the control unit, a first operational parameter relating to the moving vehicle, forming, using the control unit and only if the first indication is received, a sound control signal using a synthesizing module comprised within the control unit, wherein the sound control signal is formed based on the first operational parameter and is selected to depend on which part of the vehicle the electroacoustic transducer is connected to, and controlling, using the control unit and the driver, the electroacoustic transducer to emit the sound based on the sound control signal. This aspect of the present disclosure provides similar advantages as discussed above in relation to the previous aspect of the present disclosure.

According to a still further aspect of the present disclosure there is provided a computer program product comprising a non-transitory computer readable medium having stored thereon computer program means for controlling a sound generating arrangement adapted to emit a sound externally of a moving vehicle, the arrangement comprising a control unit, a driving unit and an electroacoustic transducer, the driving unit connected to the electroacoustic transducer, wherein the electroacoustic transducer comprises a fastener to connect the electroacoustic transducer to a part of the vehicle and the computer program product comprises code for receiving, at the control unit, a first indication that the sound is to be emitted, code for receiving, at the control unit, a first operational parameter relating to the moving vehicle, code for forming, using the control unit and only if the first indication is received, a sound control signal using a synthesizing module comprised within the control unit, wherein the sound control signal is formed based on the first operational parameter and is selected to depend on which part of the vehicle the electroacoustic transducer is connected to, and code for controlling, using the control unit and the driver, the electroacoustic transducer to emit the sound based on the sound control signal. Also this aspect of the present disclosure provides similar advantages as discussed above in relation to the previous aspects of the present disclosure.

A software executed by the control unit for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Figure 1:
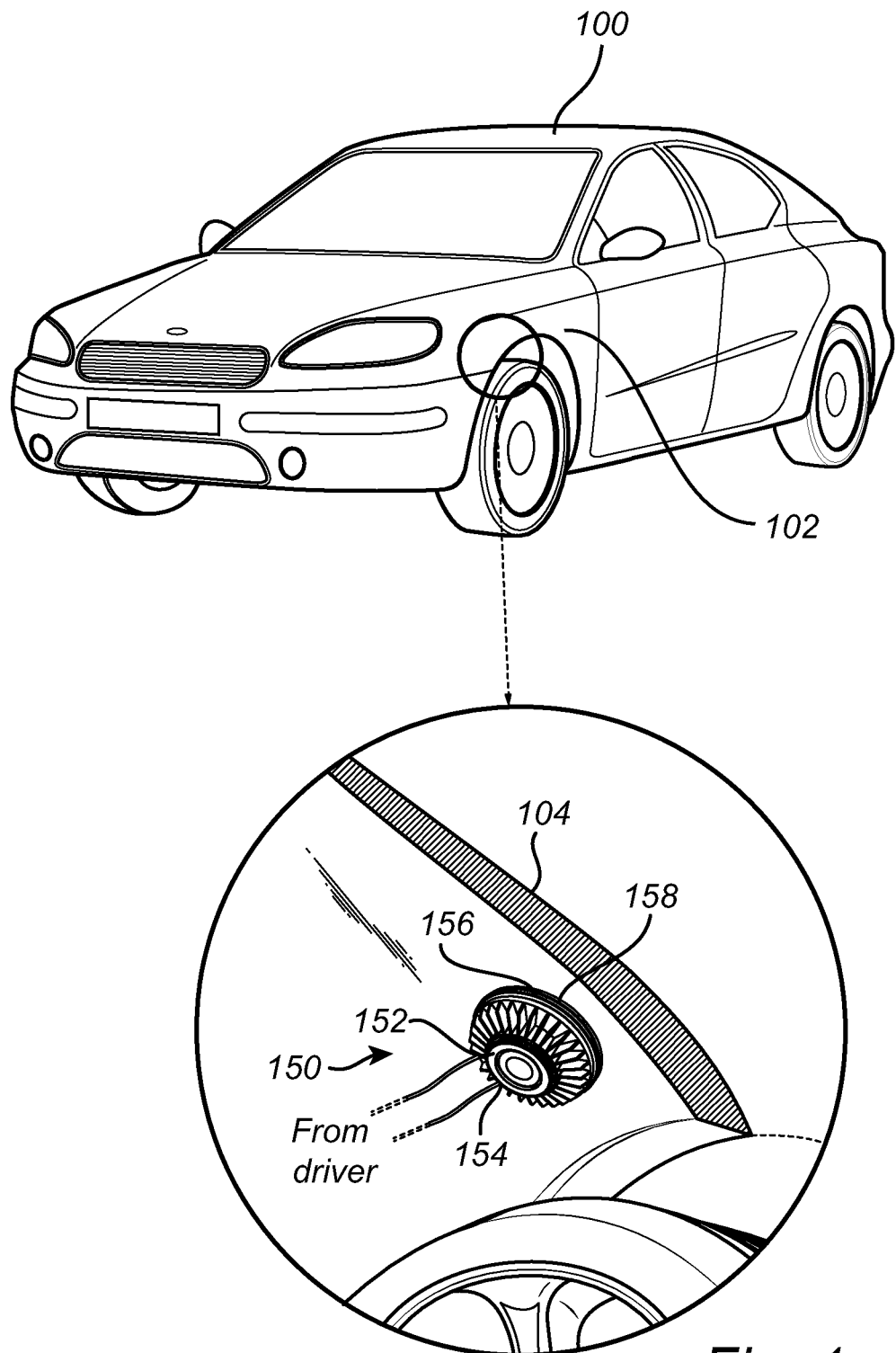
FIG. 1 illustrates a vehicle comprising a sound generating arrangement according to a currently preferred embodiment of the present disclosure, FIG. 2 provides a detailed illustration of the sound generating arrangement shown in FIG. 1.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled addressee. Like reference characters refer to like elements throughout.

Figure 2:
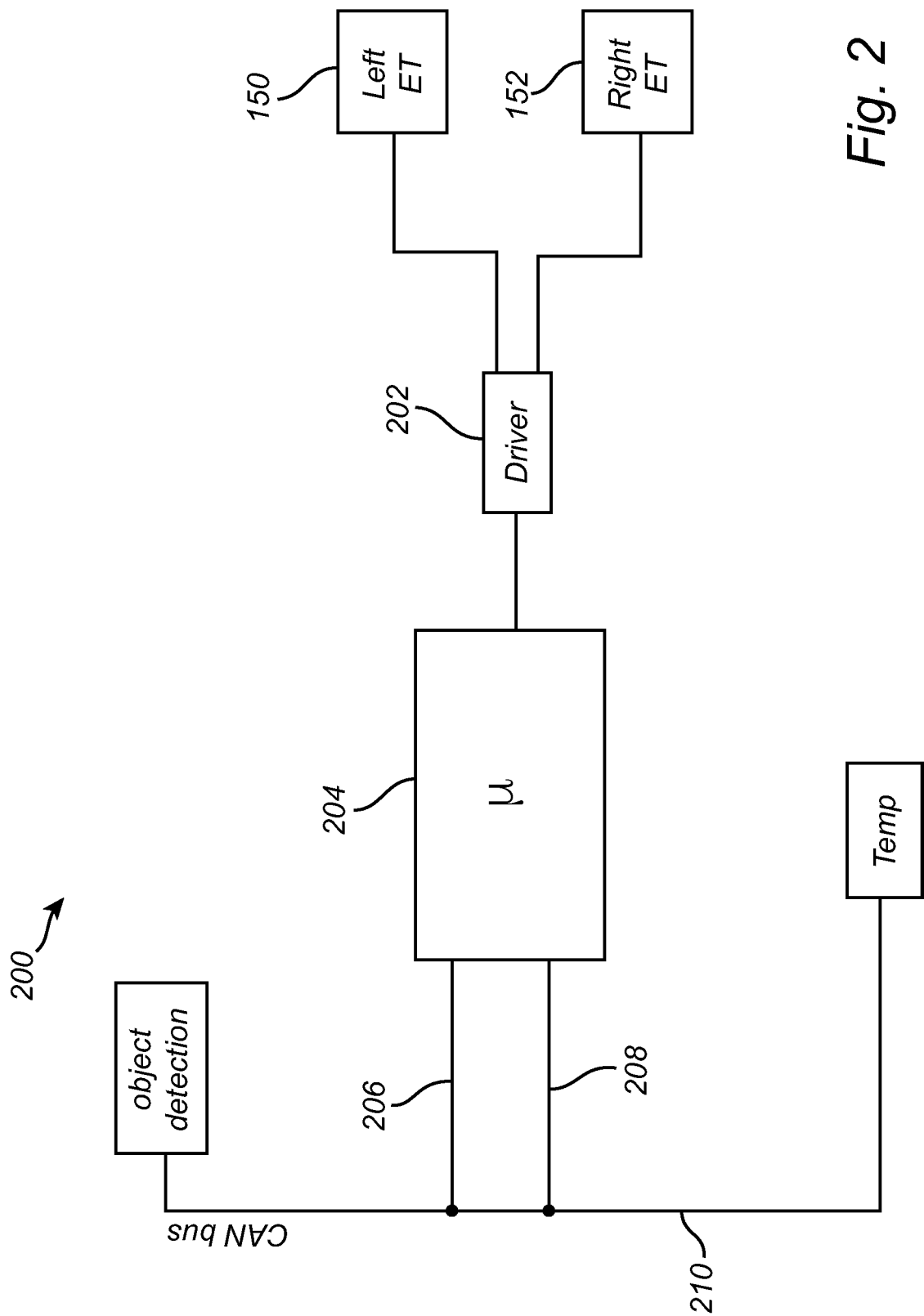

Referring now to the drawings and to FIGS. 1 and 2 in particular, there is depicted a vehicle 100 comprising a sound generating arrangement 200 according to a currently preferred embodiment of the present disclosure. In the illustration provided in FIG. 1, the sound generating arrangement 200 is shown to be connected to the left-hand side of the vehicle 100, at a wheelhouse 102 of the vehicle 100. As indicated above, the vehicle may be a hybrid vehicle (comprising e.g. an internal combustion engine, ICE, and an electric machine) or a fully electrical vehicle (not comprising an ICE). The vehicle may in turn likewise be a manually, semi-autonomous or fully autonomous vehicle. Likewise, the vehicle may be a car, a motorcycle, a truck, a marine vessel, etc. It could also be possible and within the scope of the present to make use of the sound generating arrangement 200 in relation to a low-power, lightweight electrically motorized bicycle, an electric scooter, etc.

An electroacoustic transducer 150 comprised with the sound generating arrangement 200 is in FIG. 1 shown to be fastened to a sheet metal 104 of the wheelhouse 102. The electroacoustic transducer 150 is in FIG. 1 illustrated as a sound exciter to be directly fastened to the sheet metal 104. The electroacoustic transducer 150 comprises a housing 152 comprising electrical connectors 154 allowing the electroacoustic transducer 150 to be connected to a driver 202 comprised with the sound generating arrangement 200. The electroacoustic transducer 150 further comprises a membrane structure 156 and a fastener 158. The fastener 158 may in some embodiments comprise e.g. an adhesive that is pre-applied to the membrane structure 156. Possibly the fastener 158 may comprise a silicon material. The fastener 158 may in some embodiments comprise a Very High Bond (VHB) adhesive, making it simple to connect the electroacoustic transducer 150 to the desired part of the vehicle 100.

The sound generating arrangement 200 further detailed in FIG. 2, further comprising a control unit 204, arranged in communication with the driver 202. The control unit 204 is further provided with an interface adapted to allow the control unit 204 to received e.g. a parameter 206 relating to the vehicle 100 when it is moving and a parameter 208 relating to a surrounding of the vehicle 100 when it is moving. The parameters 206 and 208 may in some embodiments be received from a CAN bus 210 comprised with the vehicle 100. The driver 202 may in some embodiments be implemented as an amplifier. In FIG. 2, the example is shown to include two electroacoustic transducers 150, for example mounted at the left and the right-hand side of the vehicle 100, such as the left and right-hand side wheelhouse 102 of the vehicle 100. It may of course be possible to include just a single electroacoustic transducer 150, or more than two electroacoustic transducers 150.

The CAN bus 210 may as mentioned above in turn be connected to functional components comprised with the vehicle 100. Such functional components may for example include a temperature sensor 212. Further components may comprise an object detection module 214 implemented by a safety system comprised with the vehicle 100.

The control unit 204 may for example be an electronic control unit (ECU), comprised with the vehicle 100, possibly manifested as a general-purpose processor, an application specific processor, a circuit containing processing components, a group of distributed processing components, a group of distributed computers configured for processing, a field programmable gate array (FPGA), etc. The control unit 204 may be or include any number of hardware components for conducting data or signal processing or for executing computer code stored in memory. The memory may be one or more devices for storing data and/or computer code for completing or facilitating the various methods described in the present description. The memory may include volatile memory or nonvolatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

Figure 3:
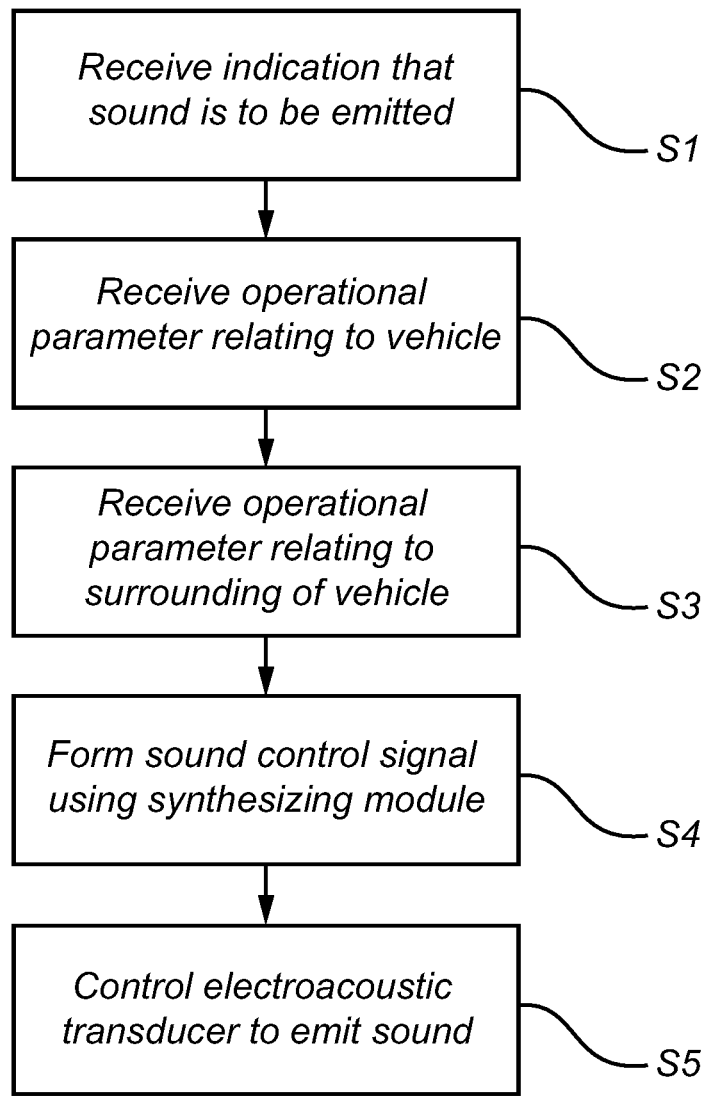
FIG. 3 shows a flow chart of a method according to an embodiment of the present disclosure.

During operation of the vehicle 100, with further reference to FIG. 3, an operation of the sound generating arrangement 200 is initiated by the control unit 204 receiving, S1, a first indication that the sound is to be emitted. Such an indication may in some embodiments of the present disclosure be that the vehicle 100 is moving. Such an indication could be received from the CAN bus 210, or alternatively from e.g. an accelerometer (not shown) comprised with the vehicle 100. As an alternative, the indication may be received in case the vehicle 100 is moving faster than a predetermined speed, such as for example faster than 20 km/h, has a negative speed (i.e. reversing) or is decelerating with a rate above a predetermined threshold (such as could be the case if the vehicle 100 is stopping quickly or is about to collide). The indication may also be received from another functional system of the vehicle 100, dictating that it would be desirable to emit a sound.

The control unit 204 further receives, S2, a first operational parameter 206 relating to the moving vehicle 100. As discussed above, the first operational parameter 206 may for example relate to a speed and/or temperature in a surrounding of the vehicle 100. Preferably, but necessarily, the control unit 204 additionally receives, S3, a second operational parameter 208, where the second operational parameter 208 relates to a surrounding of the moving vehicle 100. As should be understood, the first operational parameter 206 relates to "internal" happenings in relation to the vehicle 100, whereas the second operational parameter 208 relates to "external" happenings in relation to the vehicle 100. It should be emphasized that the sound forming scheme according to the present disclosure is adaptable in the sense that it functions also in case of a missing second operational parameter 208.

Once the first indication is received and the first operational parameter 206 and optionally also the second operational parameter 208 are available, then the control unit 204 forms, S4, a sound control signal using a synthesizing module comprised within the control unit 204 and based on the first 206 and (as indicated above optionally) the second 208 operational parameter. The synthesizing module (not explicitly shown) is comprised with the control unit 204, for example implemented as a separate hardware entity or as a software module of the control unit 204. The synthesizing module may for example implement a wavelet transform when forming the sound control signal. The sound control signal may also be adapted in relation to its frequency response, wavetable position, etc.

The synthesizing module preferably implements a strategy to ensure that a person and/or an animal in the surrounding of the vehicle 100 is made aware of the vehicle 100. The strategy for forming the sound control signal may for example be based on the following, but not exclusive, list of findings:

1) An in comparison high speed of the moving vehicle 100 makes it necessary for the sound to be received at an in comparison farther distance away from the vehicle 100, since the time it takes to travel a fixed distance is shorter if travelling at the higher speed.
2) Sound travels further and faster when the temperature in the surrounding of the vehicle is in comparison higher.
3) It is desirable to ensure that a person and/or an animal in the surrounding of the vehicle 100 is made aware of the vehicle even if e.g. a "noisy" (other) vehicle is arranged in the surrounding of the (own) vehicle 100.
4) Different objects (such as a pedestrian, cyclist, animal) are possibly in need of differently crafter sound control signal to be made aware of the (approaching) vehicle 100.
5) Thinner, smaller materials to which the electroacoustic transducer 150 tend to create louder sounds with a mid/tweeter response, while thicker, larger materials (possibly provided with multiple electroacoustic transducer 150) will be slightly quieter but result in a more full-range sound.

In accordance to the present disclosure, the synthesizing module may on the fly and as a direct result of the above listed and other input parameters and findings craft the most suitable sound control signals for the present internal and external happenings in relation to the vehicle 100. Once the sound control signal has been formed, the control unit 204 in conjunction with the driver 202 controls, S5, the electroacoustic transducer 150 to emit the sound. In line with the present disclosure, it is desirable that the sound once received at and perceived by pedestrian, cyclist, animal has a composition that ensures that the pedestrian, cyclist, animal is made aware of the vehicle 100.

In summary, the present disclosure relates to a sound generating arrangement adapted to emit a sound externally of a moving vehicle, the arrangement comprising a control unit, a driving unit and an electroacoustic transducer, the driving unit connected to the electroacoustic transducer, wherein the electroacoustic transducer comprises a fastener to connect the electroacoustic transducer to a part of the vehicle, wherein the arrangement is adapted to receive, at the control unit, a first indication that the sound is to be emitted, receive, at the control unit, a first operational parameter relating to the moving vehicle, form, using the control unit and only if the first indication is received, a sound control signal using a synthesizing module comprised within the control unit, wherein the sound control signal is formed based on the first operational parameter and is selected to depend on which part of the vehicle the electroacoustic transducer is connected to, and control, using the control unit and the driver, the electroacoustic transducer to emit the sound based on the sound control signal.

By means of the present disclosure, the sound to be transmitted if formed "on the fly" using a synthesizing module that is comprised within the control unit, as compared to general prior art approaches typically implementing different forms of playback functionalities. Advantages following the implementation scheme according to the present disclosure includes the possibility of emitting purposely crafted sounds, based at least on the first operational parameter relating to the moving vehicle, to the surrounding of the vehicle, as compared to a typical prior art solution where only a finite number of prerecorded sounds may be stored with a memory element comprised with sound generating arrangement, even in case the memory element is made in comparison large.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A sound generating arrangement adapted to emit a sound externally of a moving vehicle, the arrangement comprising a control unit, a driving unit and an electroacoustic transducer, the driving unit connected to the electroacoustic transducer, wherein the electroacoustic transducer comprises a fastener to connect the electroacoustic transducer to a part of the vehicle, wherein the arrangement is adapted to:
receive, at the control unit, a first indication that the sound is to be emitted,
receive, at the control unit, a first operational parameter relating to the moving vehicle,
form, using the control unit and only if the first indication is received, a sound control signal using a synthesizing module comprised within the control unit, wherein the sound control signal is formed based on the first operational parameter and is selected to depend on which part of the vehicle the electroacoustic transducer is connected to, and
control, using the control unit and the driver, the electroacoustic transducer to emit the sound based on the sound control signal,
wherein forming the sound control signal is formed to compensate for a type of the fastener used for connecting the electroacoustic transducer to the part of the vehicle.

2. The sound generating arrangement according to claim 1, wherein the synthesizing module is adapted to apply a wavelet transform for forming the sound control signal.

3. The sound generating arrangement according to claim 1, wherein the synthesizing module is adapted to form the sound control signal on the fly.

4. The sound generating arrangement according to claim 1, wherein the arrangement is further adapted to:
receive, at the control signal, a second operational parameter relating to a surrounding of the moving vehicle,
wherein forming the sound control signal is further based on the second operational parameter.

5. The sound generating arrangement according to claim 4, wherein the second operational parameter comprises information relating to a type of object located in a predefined surrounding of the moving vehicle.

6. The sound generating arrangement according to claim 1, wherein the first operational parameter is dependent on a current speed of the moving vehicle or a temperature measured in relation to the moving vehicle.

7. The sound generating arrangement according to claim 6, wherein the type of object is selected from a predefined list of object types.

8. The sound generating arrangement according to claim 7, wherein the predefined list of object types comprises a pedestrian, a cyclist, an animal and another vehicle.

9. The sound generating arrangement according to claim 1, wherein the fastener comprises an adhesive. the part of the vehicle the electroacoustic transducer is connected to.

10. The sound generating arrangement according to claim 1, wherein the electroacoustic transducer comprises a sound exciter.

11. A vehicle, comprising a sound generating arrangement according to claim 1.

12. A sound generating arrangement adapted to emit a sound externally of a moving vehicle, the arrangement comprising a control unit, a driving unit and an electroacoustic transducer, the driving unit connected to the electroacoustic transducer, wherein the electroacoustic transducer comprises a fastener to connect the electroacoustic transducer to a part of the vehicle, wherein the arrangement is adapted to:
- receive, at the control unit, a first indication that the sound is to be emitted,
- receive, at the control unit, a first operational parameter relating to the moving vehicle,
- form, using the control unit and only if the first indication is received, a sound control signal using a synthesizing module comprised within the control unit, wherein the sound control signal is formed based on the first operational parameter and is selected to depend on which part of the vehicle the electroacoustic transducer is connected to, and
- control, using the control unit and the driver, the electroacoustic transducer to emit the sound based on the sound control signal,
- wherein the sound control signal is formed to compensate for a type of.

13. A computer implemented method for operating a sound generating arrangement adapted to emit a sound externally of a moving vehicle, the arrangement comprising a control unit, a driving unit and an electroacoustic transducer, the driving unit connected to the electroacoustic transducer, wherein the electroacoustic transducer comprises a fastener to connect the electroacoustic transducer to a part of the vehicle and the method comprises the steps of:
- receiving, at the control unit, a first indication that the sound is to be emitted,
- receiving, at the control unit, a first operational parameter relating to the moving vehicle,
- forming, using the control unit and only if the first indication is received, a sound control signal using a synthesizing module comprised within the control unit, wherein the sound control signal is formed based on the first operational parameter and is selected to depend on which part of the vehicle the electroacoustic transducer is connected to, and
- controlling, using the control unit and the driver, the electroacoustic transducer to emit the sound based on the sound control signal,
- wherein the sound control signal is formed to compensate for a type of the part of the vehicle the electroacoustic transducer is connected to.

14. The method according to claim 13, further comprising the step of:
- applying, using the synthesizing module, a wavelet transform for forming the sound control signal.

15. The method according to claim 13, wherein the step of forming the sound control signal is made on the fly.

16. The method according to claim 13, further comprising the step of:
- receiving, at the control signal, a second operational parameter relating to a surrounding of the moving vehicle,
- wherein forming the sound control signal is further based on the second operational parameter.

* * * * *